(12) United States Patent
Greeson

(10) Patent No.: US 10,101,599 B1
(45) Date of Patent: Oct. 16, 2018

(54) SMART AUTOMATED CONTACT LENS CLEANSING DEVICE

(71) Applicant: Austin Greeson, Ventura, CA (US)

(72) Inventor: Austin Greeson, Ventura, CA (US)

(*) Notice: Subject to any disclaimer, the term of this patent is extended or adjusted under 35 U.S.C. 154(b) by 0 days.

(21) Appl. No.: 15/857,450

(22) Filed: Dec. 28, 2017

(51) Int. Cl.
    *B08B 3/00* (2006.01)
    *G02C 13/00* (2006.01)
(52) U.S. Cl.
    CPC .................. *G02C 13/006* (2013.01)
(58) Field of Classification Search
    None
    See application file for complete search history.

(56) References Cited

U.S. PATENT DOCUMENTS 4,582,076 A * 4/1986 Prat .......................... A61L 12/04
134/107
2009/0211925 A1 * 8/2009 Doniga ................ A45C 11/005
206/5.1

* cited by examiner

*Primary Examiner* — Eric W Golightly
(74) *Attorney, Agent, or Firm* — Norton Rose Fulbright US LLP

(57) ABSTRACT

An automated contact lens cleansing device, and method of using the device, for performing cleansing cycles, the device comprising: a solution storage unit, a receptacle containing sterile cleansing solution, wherein the receptacle becomes unsealed when mated with the storage unit; a first solution transfer line that draws the sterile cleaning solution from the receptacle; a cleansing reservoir that receives the cleansing solution drawn by the first solution transfer line; a circulator that circulates the sterile cleansing solution through the cleansing reservoir for a determined time, wherein the sterile cleansing solution is determined to be used solution upon circulating through the cleansing reservoir for the determined circulating time; a second solution transfer line that draws the used solution from the cleansing reservoir; a memory that stores instructions to perform the cleansing cycles; and a processor that controls circulation of the sterile cleansing solution through the cleansing reservoir for the determined time.

20 Claims, 10 Drawing Sheets

SMART AUTOMATED CONTACT LENS CLEANSING DEVICE

TECHNICAL FIELD

The present disclosure generally relates to automated cleansing devices. Specifically, the present disclosure relates to smart automated cleansing devices that communicate wirelessly and can be effectively utilized to cleanse, e.g., contact lenses.

BACKGROUND OF THE INVENTION

Contact lenses are a popular means of correcting eyesight and/or changing the color or appearance of eyes. As the technology of contact lenses has evolved, soft contact lenses have been made available by the eye correction industry. Soft contact lenses can be worn for a threshold amount of time per day (a wear threshold). The wear threshold can vary from one contact lens to another, but once the wear threshold expires, it is intended that a user will remove the contact lenses from their eyes.

Some soft contact lenses are reusable for a period of time. For example, soft contact lenses can be reused ten (10) times, thirty (30) times, or the like (a use threshold). In order to ensure cleanliness over an extended period of days, reusable contact lenses are often cleansed between uses. For example, upon expiration of a wear threshold, a user is expected to remove the contact lenses and perform a cleansing routine to cleanse the lenses. Thereafter, the user is expected to store the contact lenses in a sterile, moist environment during a time period the user should not wear contact lenses to avoid fatigue (a resting threshold). Once the resting threshold expires, a user has the option of reusing that contact lens by reinserting the lens into the user's eye. Accordingly, the same contact lens can be used, cleansed, stored, and reused until its use threshold expires. Once the use threshold expires, the user is expected to dispose of the contact lens and begin using a new lens.

In theory, reusable lenses are cost effective, convenient, clean, and pose few risks to the user's eyes. That said, hygiene is one of the most important factors in preventing infections and other problems that affect the short term health of eyes as well as long-term vision. In practice, it has been discovered that users often refuse or forget to follow their prescribed cleansing and sanitary storing routines. This can result from the fact that a manual cleansing process is arduous.

According to a manual cleansing process, a user is instructed to wash his or her hands prior to touching the contact lens or anything that will touch the contact lens. Then, the user removes a contact lens from his or her eye and places it in the palm of his or her clean hand. The user sprays fresh, unused contact lens cleansing solution over the contact lens and allows the solution to pool in the palm of his or her hand. The user rubs the front and back of the lens with a clean finger on their other hand. The user avoids touching the lens with their fingernails because they can carry bacteria and can cut or damage the lens. After having rubbed the lens' surface, the user rinses the lens with fresh, unused cleansing solution.

Once the lens is cleansed, the user places the lens in a clean contact lens storage case, which itself should be cleansed and dried before removing the contact lens from the eye. The contact lens storage case is cleansed by spraying the contact lens storage case with fresh, unused contact solution. Water should not be used to cleans a contact lens storage case because water is filled with bacteria, impurities, and microorganisms. After the contact lens storage case is properly cleansed, the contact lens storage case should be overturned and allowed to air dry. Contact lens storage cases should be stored at a distance from toilets to avoid contamination.

The user places the lens into the clean contact lens storage case and fills the contact lens storage case with fresh, unused contact solution. The user should use at least a threshold amount of fresh, unused contact solution, which can be indicated by a line on the contact lens storage case. The contact lens storage case should not be filled with used solution because used solution can lead to contamination. Once the contact lens storage case is filled with the threshold amount of fresh, unused contact solution, the contact lens remains submerged in the contact solution for a threshold cleansing time. The lens should not be removed before the threshold cleansing time expires to ensure any air bubbles clinging to the lens surface dissipate. This allows the solution to saturate the entire lens surface. Further, the threshold cleansing time allows the contact solution to fully dissolve proteins and lipids, which can build on the lens surface.

A user's lack of compliance with the foregoing regimen leads to major complications. Users often deposit proteins and lipids on the surface of a contact lens. Further, pollution and dirt deposit on the surface of a contact lens. As these deposits build up, users experience decreased vision, irritation, and conjunctivitis. Depending on the severity of conjunctivitis, a user can experience redness, itchiness, pain, and photophobia. The industry has attempted to reduce the complications associated with reusable soft contact lenses, but currently available solutions are ineffective or rejected by users.

One proposed solution involves reducing the use threshold. The idea is as follows: if users will not properly cleanse and store their contact lenses, then reducing the use threshold will cause the lenses to be disposed of before protein, lipids, pollution, and/or dirt deposits build to dangerous proportions. So the industry created soft contact lenses having reduced use thresholds as low as a single use. This solution seems plausible but has been ineffective in practice. That is, merely reducing the use threshold is prohibitively expensive. As of now, single use contact lenses cost significantly more than contact lenses having a longer use threshold. In some circumstances, users wear single-use lenses multiple times in order to save money, and such unintended use leads to protein and lipid build up, contamination, and eye infection.

Another proposed solution involves using an ultra-sonic machine to clean lenses using ultra-sonic vibrations. When the user is ready to remove their contact lenses, the user opens the lid of the ultra-sonic machine, removes his or her contact lenses, places the contact lenses in a basket inside the ultra-sonic machine, fills the ultra-sonic machine with a threshold amount of fresh, unused contact solution, closes the lid, and presses a button to initiate ultra-sonic vibrations. When initiated, ultra-sonic frequencies cause air bubbles to develop and move about the contact lenses. Manufactures of ultra-sonic machines assert that the generated air bubbles cleans the lenses in as little as two minutes and alleviate the user's previous need to rub the lenses with their fingers and store the lenses in solution for the threshold cleansing time. As such, according to manufactures of the ultra-sonic machines, the contact lenses are cleansed just as effectively with less time and less effort.

However, in practice, the industry has discovered the ultra-sonic machines leave much to be desired when it comes to cleansing contact lenses. While ultra-sonic vibrations cause air bubbles to move through the solution, they do not move in any particular direction. As such, it is only a matter of chance if air bubbles affixed to the lens surface dissipate prior during vibration. Air bubbles that fail to dissipate from lens surfaces prevent the lens from being properly cleansed and can lead to infection. As such, doctors recommend rubbing contact lenses prior to using the ultra-sonic machine, regardless of the manufacturer's instructions. In practice, users tend to follow procedures that are less time consuming, so they forget or choose to forgo the rubbing process, and ultra-sonic machines provide a false sense of security regarding contact cleanliness.

Further, contact lens cleansing solution has a recommended storage threshold, as explained above. To effectively ensure all air bubbles dissipate from the lens surface and all proteins and lipids are dissolved, it is recommended that contact lenses remain submerged in cleansing solution for a threshold cleansing time. The manufacturers of ultra-sonic machines tout that ultra-sonic technology cleanses lenses in about two minutes, after which the lenses can be removed from the machine. Such an instruction provides a false since of lens cleanliness because two minutes is insufficient for the cleansing solution to dissolve proteins and lipids. Thus, if the user removes the lenses from the ultra-sonic machine and inserts them into their eyes after two minutes of cleansing, at least two problems occur: (1) the user risks wearing lenses that are not sufficiently cleansed, and (2) the user's eyes can be susceptible to hypoxia (i.e., oxygen loss to the eye).

Therefore, to properly clean contact lenses while using an ultra-sonic machine, a user would remove the lenses from the ultra-sonic basket and store them in a storage case that is filled with fresh, unused solution. As can be seen, in order to properly clean lenses using an ultra-sonic machine, a user would first rub the lenses with their fingers, place the lenses in the ultra-sonic machine for two minutes, remove the lenses and store them in a storage container for the threshold cleansing time (and/or resting threshold time). Therefore, in use, the ultra-sonic machine adds steps to the contact lens cleansing process and provides a false sense of cleanliness that leads to an increased risk of eye infection.

Further, ultra-sonic machines must be cleansed. As with other lens cleansing devices, contact solution, rather than water, should be used to rinse the machines. In addition, to deep clean an ultra-sonic machine, a user unplugs the machine and allows it to rest for at least one hour. Then, the machine is wiped throughout with a sponge or cloth dampened with detergent and hot water. Thereafter, the machine is thoroughly rinsed to remove all soap residue. Being that water includes contaminates, rinsing with contact solution is recommended. It has been determined that users rarely, if ever, perform this cleansing regimen. Further, users often damage a machine's electronics during the cleansing process.

SUMMARY

In view of the foregoing, inventive concepts described herein simplify the contact lens cleansing regimen from the user's prospective, while increasing the cleanliness of reusable contact lenses from a sanitation perspective. Systems and methods herein involve a cleansing device that forces fresh, unused contact lens solution in a manner that jets the front and back surfaces of a contact lens with sufficient force to prevent air bubbles from clinging to surface areas of the lens. Further, the cleansing device submerges the contact lens in the fresh, unused contact cleansing solution for a controlled threshold cleansing time to ensure proper removal of contaminate build-ups on the contact lens. Further still, concepts described herein automatically cleanse and dry the cleansing device itself. As a result, the cleansing device can be made ready for another contact lens cleansing cycle prior to the user's next scheduled cleansing cycle.

Embodiments of the described cleansing device automate the contact lens cleansing procedure, thereby increasing the probability that a cleansing cycle is performed according to doctor recommendations. For example, a user is less likely to use insufficient amounts of cleansing solution. A user is also less likely to reuse old, contaminated cleansing solution. The cleansing device reduces a user's likelihood of skipping steps that would remove air bubbles from the surface of contact lenses. Further, the cleansing device reduces the likelihood that contact lenses are removed from the cleansing solution prior to the prescribed threshold cleansing time.

In embodiments, a cleansing device includes one or more unused solution storage that receives a disposable receptacle having sterile solution therein. If the device includes more than one unused solution storage, the stored solutions can be different from each other. The device can further include a cleansing reservoir and a circulator that circulates solution drawn from the unused solution storage through the cleansing reservoir until a threshold amount of circulating time expires. Further, the device can include a drain line that releases the solution from the cleansing reservoir into a drain. The device can include a memory that stores at least one cleansing cycle; and a control processor that controls the circulator, the drain line, and the one or more unused solution storage according to a cleansing cycle of the at least one cleansing cycle stored in the memory.

In further embodiments, the device can include a transceiver that receives one or more data structures that contain or relate to instructions to initiate a cleansing cycle. These received instructions can be stored and subsequently updated in memory. Instructions to initiate a cleansing cycle can be directed to a device self-cleansing cycle, a contact lens cleansing cycle, and/or a cycle that cleanses another item.

According to inventive concepts, the device can also include one or more sensors that collect data. The collected data can also be stored in memory and utilized to make decisions regarding certain functions to be performed. The data can, e.g., relate to a condition of device components, a condition of the user, and/or use of the device. In embodiments, a device transceiver communicates with a remote device and/or one or more nodes across one or more networks. Device outputs can convey information such as instructions for use, reminders, environmental conditions, device performance and maintenance reports, and the like. For example, a service call can be initiated based at least on some of the data.

According to other embodiments, methods for controlling a cleansing device can comprise receiving and storing data structures containing or relating to instructions to initiate a cleansing cycle. A device processor can execute instructions to perform the cleansing cycle, which can comprise releasing a cleansing solution from a disposable sterile receptacle, circulating the solution until a threshold amount of circulating time expires, releasing a drain line, where the solution drains through the drain line.

Methods can also comprise collecting data relating to a condition of device components. The collected data can also be stored in memory and utilized to make decisions regarding certain functions to be performed. The data can, e.g., relate to a condition of device components, a condition of the user, and/or use of the device. In embodiments, a device transceiver communicates with a remote device and/or one or more nodes across one or more networks. Device outputs can convey information such as instructions for use, reminders, environmental conditions, device performance and maintenance reports, and the like. For example, a service call can be initiated based at least on some of the data.

The foregoing has outlined rather broadly the features and technical advantages of present example inventions described herein in order that the detailed description of the example inventions that follows can be better understood. Additional features and advantages of the example inventions will be described hereinafter which form the subject of the claims of the example inventions. It should be appreciated by those skilled in the art that the conception and specific embodiment disclosed can be readily utilized as a basis for modifying or designing other structures for carrying out the same purposes of the present example inventions. It should also be realized by those skilled in the art that such equivalent constructions do not depart from the spirit and scope of the example inventions as set forth in the appended claims. The novel features which are believed to be characteristic of the example inventions, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present example inventions.

BRIEF DESCRIPTION OF THE FIGURES

For a more complete understanding of the present example inventions, reference is now made to the following descriptions taken in conjunction with the accompanying figures, in which.

DETAILED DESCRIPTION OF THE INVENTION

Figure 1:
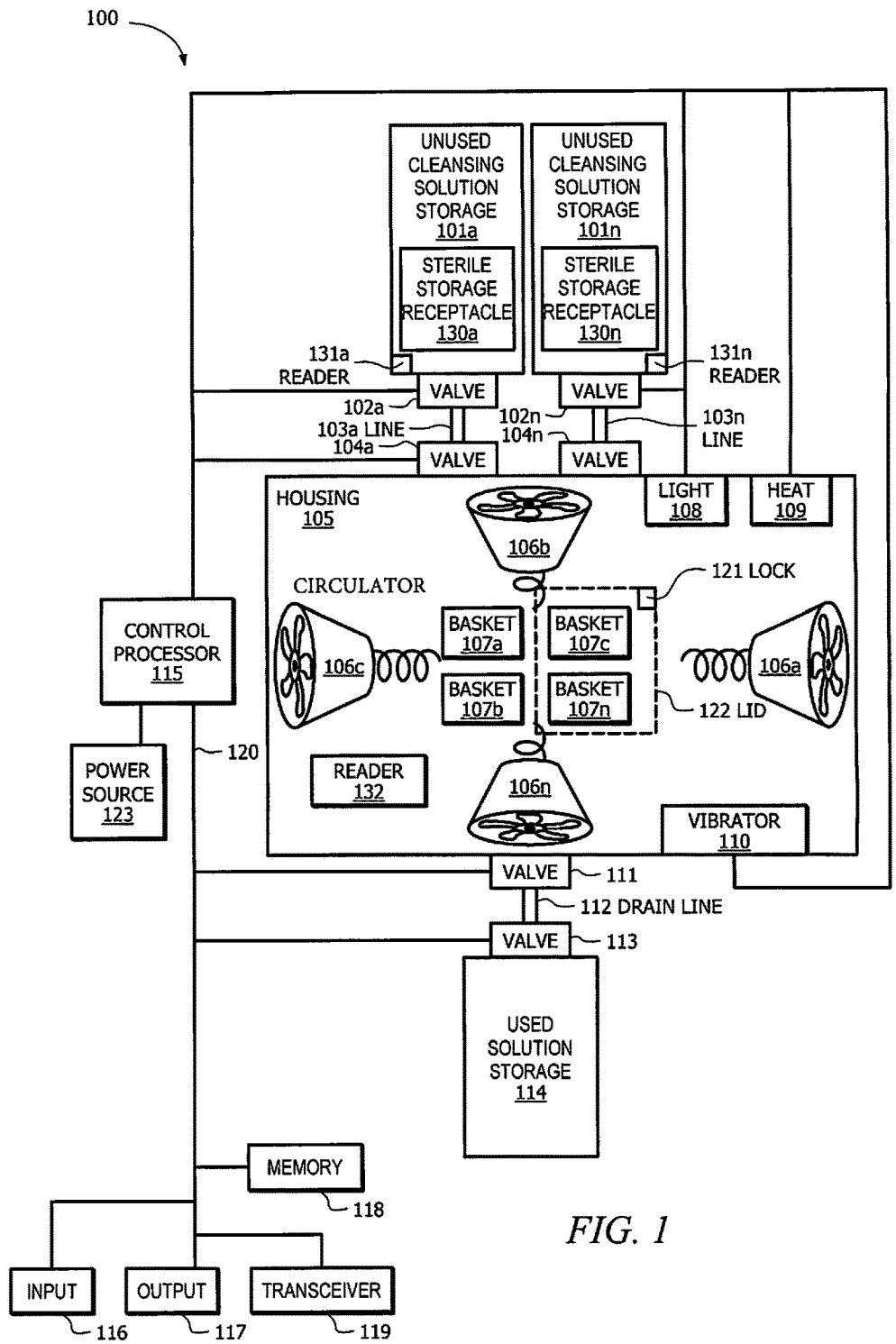
FIG. 1 is a block diagram of an exemplary embodiment of a cleansing device as disclosed herein.

FIG. 1 illustrates certain aspects of exemplary cleansing device 100. In preferred embodiments, cleansing device 100 cleanses one or more contact lenses. However, cleansing device 100 can be used to clean and/or sterilize any number of objects, for example, toothbrush heads, makeup utensils, manicure and pedicure utensils, eye glasses, jewelry, baby supplies, facial brushes, hair brushes, skin brushes, kitchen utensils, medical devices and utensils, surgical utensils, and more. Cleansing device 100 includes at least one housing 105. In embodiments, housing 105 includes circuitry that controls processes and operations of some or all components of cleansing device 100. The circuitry can include control processor 115, power source 123, memory 118, input 116, output 117, transceiver 119, communications link 120 (wired and/or wireless) that communicates information to and from various components of cleansing device 100, and/or more as is described in further detail below in FIG. 3.

Cleansing device 100 includes one, two, three, or more unused cleansing solution storage 101a-101n. In this example, unused cleansing solution storage 101a-101n stores fresh, unused cleansing solution, (e.g., contact cleansing solution, brush cleansing solution, utensil cleansing solution, jewelry cleansing solution, and/or any type of cleansing solution). An unlimited list of example sterile storage containers include but is not limited to: a cartridge, a syringe, a vessel, a bag, a bottle, a vial, a jar, a jug, a vacuum bottle, a cylinder, a tube, a capsule, a case, and/or any combination thereof, and/or the like). The sterile storage receptacle 130a-130n can be sealed prior to a user receiving the sterile storage receptacle 130a-130n (e.g., at a manufacturing site) thereby maintaining the sterility of the sterile storage receptacle 130a-130n and the cleansing solution therein. The sterile storage receptacle 130a-130n can be disposable and intended as a one-use sterile storage receptacle. The sterile storage receptacle 130a-130n can be shaped to compatibly fit within and remain stored within unused cleansing solution storage 101a-101n in any manner desired. For example, sterile storage receptacle 130a-130n can be shaped with a male coupling configuration while unused cleansing solution storage 101a can be shaped with a female coupling configuration, such that sterile storage receptacle 130a is received into unused cleansing solution storage 101a as a male to female coupling. In examples, sterile storage receptacle 130a-130n can include a seal, which can be pierced by unused cleansing solution storage 101a-101n during and/or after insertion of sterile storage receptacle 130a-130n, thereby preventing contamination of the component and cleansing solution stored therein.

In another example, unused cleansing solution storage 101a-101n can be a storage tank having a lid thereon. In embodiments, a user can open a bottle, vial, jar, and/or the like, and manually pour the unused, fresh cleansing solution into the unused cleansing solution storage 101a-101n, and close the lid thereon to contain the unused, fresh cleansing solution inside. In embodiments, unused cleansing solution storage 101a-101n can be connected to a pump that pumps unused, fresh cleansing solution into unused cleansing solution storage 101a-101n from a large sterile storage receptacle stored remotely from cleansing device 100. Any manner of storing and/or receiving unused, fresh cleansing solution into unused cleansing solution storage 101a-101n can be done.

Further, the manner of storing and/or receiving unused, fresh cleansing solution into unused cleansing solution storage 101a can be the same and/or different from the manner of storing and/or receiving unused, fresh cleansing solution into unused cleansing solution storage 101b-101n. Moreover, the shape, size, and design of unused cleansing solution storage 101a can be the same or different from unused cleansing solution storage 101b-101n. For example, unused cleansing solution storage 101a can be shaped to mate with a cartridge, while unused cleansing solution storage 101n can be configured to be manually filled via a removable lid, or automatically filled via a pump. In examples, the solution stored in unused cleansing solution storage 101a can be the same solution or a different solution from other unused cleansing solution storages 101b-101n. In examples, unused cleansing solution storage 101a can store a daily cleansing solution, while unused cleansing solution storage 101n can store a rinsing and/or storing solution. In other examples, unused cleansing solution storage 101a can store a daily cleansing solution, while unused cleansing solution storage 101n stores a solution that is used less frequently (e.g., a weekly enzyme solution). Further, one or more of unused cleansing solution storage 101a-101n can store and/or dispense tablets, particles, powder, a mixture, and/or other items, solid or not, (e.g., enzyme tablets, neutralizing powder, gaseous mixture, etc.) that can automatically and controllably be released, according to a set schedule, on demand, and/or the like. Further still, unused cleansing solution storage 101a can store a solution that cleanses contacts, while unused cleansing solution storage 101n can store a solution that cleanses the cleansing device 100 itself.

Yet further, one or more of unused cleansing solution storage 101a-101n can store and/or controllably dispense medication, prescription or otherwise, and/or other eye treatments. For example, unused cleansing solution storage 101a-101n can store one or more of, and/or a mixture of, Azelastine, Bepotastine 1.5%, Cromolyn, Acular-Ketorolac Ophthalmic, Artificial Tears, Atropine Ophthalmic, Avastin for macular degeneration, Brimondine Ophthalmic (Alphagan), Ciloxan Ointment, Erythromycin Ointment, Gentamicin eye drops, Levobunolol Ophthalmic (Betagan), Lucentis, Macugen, Metipranolol (Optipranolol), Optivar, Patanol, PredForte Ophthalmic, Proparacaine, Timoptic, Trusopt, Visudyne (Verteporfin), Voltaren, Xalatan, allergy medication and/or treatments, antibiotic medication and/or treatments, vitamins, and/or the like.

In embodiments, fresh, unused cleansing solution from one or more of unused cleansing solution storage 101a-101n can be collected and used for testing and diagnostic purposes. The testing and diagnostic purposes can test and diagnose one or more user of cleansing device 100 and/or be used in case studies involving a statistically significant number of subjects. One or more of unused cleansing solution storage 101a-101n can include testing and diagnostic sensors 131a-131n therein, that receive input (data) from the fresh, unused solution in the one or more of unused cleansing solution storage 101a-101n. The data can be communicated to control processor 115 and/or stored in memory 118. Control processor 115 can run analytics on the collected data and store the analytics in memory 118. Control processor 115 can display a graphics user interface (GUI) via output 117, which can be an LED screen and/or touch screen. Control processor 115 can transmit the analytics and/or the raw data from sensors 131a-131n to a central computing device (e.g., server, computer, laptop, smart watch, smart phone, tablet, and/or the like), as is described further below with reference to FIGS. 3-4.

In embodiments, collected data can indicate that additional unused, fresh cleansing solution should be ordered and/or which type of cleansing solution should be ordered. Such information can be conveyed on the GUI, and the GUI can provide a user with the ability to order the suggested cleansing solution using a touch screen of input/output 116/117. A user can have an online account having profile information including payment information, shipping information, preferences, health insurance information, and the like stored therein. With one or more clicks, a user can order additional products as is suggested in the GUI via the data collected from the testing and diagnostic sensors 131a-131n of unused cleansing solution storage 101a-101n. Other information can be conveyed as well, such as an indication that one or more component parts of cleansing device 100 is due for maintenance or should be replaced, repaired, sanitized, and/or the like.

Unused solution storage 101a can include a valve 102a that actuates to controllably release fresh, unused cleansing solution from unused solution storage 101a into line 103a. In embodiments, line 103a can couple to value 104a that actuates to controllably release fresh, unused cleansing solution from line 103a into one or more portion of housing 105. Valves 102a and 104a can be controlled by control processor 115, as is further described below. Additional unused solution storages 101n can include valves 102n that actuates to controllably release fresh, unused cleansing solution from unused solution storages 101n into line 103n. In embodiments, line 103n can couple to valves 104n that actuates to controllably release fresh, unused cleansing solution from line 103n into one or more portions of housing 105. Valves 102n and 104n can also be controlled by control processor 115 as is further described below. Additional lines and valves can be included, as is desired to control the flow of fresh, unused cleansing solution.

Housing 105 includes one or more baskets 107a-107n, which can each store one or more items for cleansing. Additionally and/or alternatively, one or more of baskets 107a-107n can be a box, crate, bin, barrel, cradle, creel, hamper, pan, bassinet, and/or the like. Further, one or more of baskets 107a-107n can be the same shape, size, and/or design, and one or more of baskets 107a-107n can be a different same shape, size, and/or design. In this example, one or more baskets can store an item for cleansing therein. One or more of baskets 107a-107n can include a lid that can manually open and close (e.g., via a user's fingers). One or more of baskets 107a-107n can include a lid with an actuator that is controlled by control processor 115 such that the lid transitions between open and closed positions without a user touching the lids, thereby minimizing contamination of a basket by fingers opening the lid of the basket. For example, control processor 115 can employ mechanical, electrical, or magnetic actuation to actuate movement of a basket's lid and/or any component of device 100.

Baskets 107a-107n can be accessed individually and/or as one or more groups. In embodiments, housing 105 can include a lid and/or door that opens and closes such that one or more baskets 107a-107n is exposed simultaneously. For example, housing 105 can include lid 122, wherein baskets 107a-107n are accessible via lid 122. In another example, housing 105 can include two or more lids/doors that provide access to one or more specific baskets at a time. Baskets 107a-107n can be accessed via a drawer mechanism, for example, one or more of the baskets can slide open as a drawer. Some or all of the baskets can be accessed in the same or different manners. One or more of the lids, doors, drawers, and/or the like can include a locking mechanism. The one or more locking mechanism 121 can be controlled manually. In embodiments, control processor 115 can control one or more locking mechanism 121 according to one or more cleansing cycle. For example, housing 105 as a whole, and/or one or more baskets individually, can have controlled access based on a threshold minimum and/or maximum amount of time that a cleansing cycle is performed. One or more cleansing cycles can be performed to maintain items within the housing 105 and/or individualized baskets based on any of the one or more thresholds mentioned herein. Various thresholds can comprise time, temperature, use frequencies, sanitation test levels, litmus test levels, enzyme levels, protein levels, and/or the like.

Housing 105 can also include one or more circulators 106a-106n. In this example, circulators 106a-106n circulate solution. Additionally, and/or alternative, one or more of circulators 106a-106n can circulate air, particulates, solvents, a different solution, and/or the like. Circulators 106a-106n can be controlled by control processor 115 such that one or more circulators 106a-106n operates at the same or different speeds, at the same or different times, on the same or different cleansing cycles, and/or the like. One or more of the circulators 106a-106n can include one or more blades, propellers, struts, pumps, and/or the like that spin and/or move at one or more varying speeds on a spectrum from slow to fast. The spinning of blades and/or actuation of pumps can compress or squeeze air, solution, fluid, solvent, and/or the like, and blast, squirt, drive, and/or shoot the material out of a narrow portion of the circulator 106a-106n. One or more circulators 106a-106n can be the same and/or different as one or more of the circulators 106a-106n. One or more circulators 106a-106n can be bigger, smaller, wider, narrower, shorter, taller, and/or taper at a different tapering rate as compared to the circulators 106a-106n. Various circulators can be positioned at different locations within housing 105 at different or the same angles as compared to baskets 107a-107n, and can operate based on whether one or more baskets is currently in use.

Housing 105 can also include one or more light 108. Light 108 can be one or more light emitting diode (LED), if desired, and/or any other type of light (e.g., UV light, laser, etc.). Light 108 can emit light of any desired frequency including light of the visible spectrum and/or light of the invisible spectrum. Light 108 can provide ambiance, an esthetic light show, and/or function as a night light. Light 108 can provide visible light to assist a user's ability to see inside and/or outside housing 105. Light 108 can be used to communicate information, including a cleansing cycle's progress, timing, and/or completeness, a cleansing solution's level, a storage tank's fullness, a basket's state and/or use, a circulator's state and/or functionality. Light 108 can provide heat, for example, to heat cleansing solution while a cleansing cycle is in progress and/or to sanitize the cleansing device 100 during a self-cleansing cycle, after an item's cleansing cycle is complete. Further, light 108 can be used as a heating source to expedite evaporation, at times (e.g., when housing 105 is being stored in a dry state). Light 108 can provide scavenging, sterilization (e.g., via UV rays which kill microbes and keep air sterile), and the like. Light 108 can be controlled by control processor 115, via user input, and/or preprogramed processes.

Housing 105 can include one or more heating unit 109. Heating unit 109 can be a heat plate, one or more resistors, conducting surface, and/or the like, that produces heat. Heating unit 109 can be controlled by control processor 115 according to one or more cleansing cycles, self-cleansing cycles, and/or the like. Heating unit 109 can function according to preprogramed heating cycles, one or more measured thresholds (as is described herein), and/or according to user input. Heat unit 109 can provide heat, for example, to heat cleansing solution while an item is being cleansed and/or to sanitize the housing itself during a self-cleansing cycle. Further, heat unit 109 can be used as a heating source to expedite evaporation at times (e.g., when housing 105 is being stored in a dry state). Heat unit 109 can provide scavenging, sterilization, and the like. Heat unit 109 can be controlled by control processor 115, via user input, and/or preprogramed processes.

Housing 105 can include one or more vibrator 110. Vibrator 110 can be controlled by control processor 115 to vibrate at one or more frequencies, for one or more cleansing cycles, for one or more amounts of times. For example, vibrator 110 can vibrate at ultrasound frequencies (e.g., about 20-400 kHz). Other example frequencies that can be used are infrasonic, sonic, hypersonic, and go up to and beyond $10^{20}$ Hz. Vibrator 110 can be utilized as part of one or more cleansing cycles, one or more self-cleansing cycles, and to expedite evaporation at times (e.g., when housing 105 is being stored in a dry state). Vibrator 110 can be controlled by control processor 115, via user input, and/or preprogramed processes.

Housing 105 can include a one or more testing and/or diagnostic sensors 132 therein, that receive input (data) from before, during, and/or after a cleansing cycle, self-cleansing cycle, and/or storing mode. The data can be communicated to control processor 115 and/or stored in memory 118. Control processor 115 can run analytics on the collected data and store the analytics in memory 118. Control processor 115 can display a graphics user interface (GUI) via output 117, which can be an LED screen and/or touch screen. Control processor 115 can transmit the analytics and/or the raw data from sensors 131a-131n to a central computing device (e.g., server, computer, laptop, smart watch, smart phone, tablet, and/or the like), as is described further below with reference to FIGS. 3-4.

Any combination of none, one, or more circulators 106a-106n, none, one, or more baskets 107a-107n, none, one, or more lights 108, none, one, or more heat units 109, none, one, or more vibrators 110, and/or the like can operate alone and/or in combination with each other and can be controlled manually and/or automatically via user input 116, via control processor 115, via one or more program stored in non-transient memory 118, via input received by transceiver 119, and/or based at least partly on information determined by sensor 132.

Data from any portion of one or more circulators 106a-106n, one or more baskets 107a-107n, one or more lights 108, one or more heat units 109, one or more vibrators 110, and/or the cleansing solution (used and/or unused) can be used for testing and diagnostic purposes. The testing and diagnostic purposes can test and/or assist in a diagnoses of one or more users of cleansing device 100 and/or be used in case studies involving a statistically significant number of subjects. One or more circulators 106a-106n, one or more baskets 107a-107n, one or more lights 108, one or more heat units 109, and/or one or more vibrators 110 can include testing and diagnostic sensors therein, that receive input (data) before, during and/or after a cleansing cycle, self-cleansing cycle, and/or storage mode. The data can be communicated to control processor 115 and/or stored in memory 118. Control processor can run analytics on the collected data and store the analytics in memory 118. Control processor 115 can display a graphics user interface (GUI) on output 117, which can be an LED screen and/or touch screen. Control processor 115 can transmit the analytics and/or the raw data from cleansing device 100 to a central computing device (e.g., server, computer, laptop, smart watch, smart phone, tablet, and/or the like) as will be explained in more detail below with reference to FIGS. 3-4.

In embodiments, collected data can indicate that one or more component parts within housing 105 is in error, malfunctioning, needs replacements, needs servicing, cleansing, and/or the like. Such information can be conveyed on the GUI, and the GUI can provide a user with the ability to order the suggested component using a touch screen of input/output 116/117. A user can have an online account having profile information including payment information, shipping information, preferences, health insurance information, and/or the like stored therein. With one or more clicks, a user can order additional products as is suggested in the GUI based on data collected from the testing and diagnostic sensors of the device and/or any component thereof. Additionally, and/or alternatively, a service provider can automatically send additional products as is determined by the service provider based on data collected without a user having to proactively order the products. The service provider automatically sending products to the user can utilize information in their profile to charge the user and/or their insurance company for the products.

Diagnostic information can also be conveyed to a central location to identify common component part defects, such that future devices can be improved and/or recalls can be effectively administered (e.g., FDA (federal drug administration) recalls). Further, maintenance information and/or installation instructions can be communicated to the user via their smart phone and/or the GUI to help a user service their cleansing device 100. Additionally, and/or alternatively, information from the collected data can trigger a service call with a service provider. For example, a user can be prompted to schedule a service call and/or a service provider can be prompted to initiate a service appointment with the user. The GUI can provide a list of service providers based on information from the collected data, such that the list of service providers is prioritized, ordered, and/or limited to service providers offering services related to the determined issue needing servicing. For example, a service call can send a person to a user's home to handle a repair issue, installation issue, and/or cleansing issue. In another example, a service call can involve a health issue, wherein diagnostic information collected from the testing and diagnostic sensors is used to diagnose or flag a potential diagnoses of a medical condition of the user (e.g., an eye infection). The list of service providers can be medical care providers, and/or a medical care provider can be prompted to initiate contact with the user, for example, via a phone call, via the GUI, or in a next scheduled doctor's visit.

The testing and diagnostic sensors can collect information useful in detecting ailments of the eye (e.g., conjunctivitis, blepharitis, keratitis, malnutrition, and/or the like) and/or other ailments of the user (e.g., diabetes, autoimmune disorders, and/or other ailments). Any information collected from the device can be stored in memory 118 and analyzed via control processor 115 and/or transmitted to a remote location for storage and/or analytics. Raw data and/or analyzed data related to ailments can be communicated with one or more doctors who can make recommendations and/or schedule a doctor's appointment based at least on the data collected by testing and diagnostic sensors of the device.

Further, collected information can be sent to an insurance company. The insurance company can use the data to confirm and/or validate medical claims, medical codes, treatments, diagnoses, medication, and/or otherwise prevent fraudulent activity of a user or a medical service provider. The validation process can be performed prior to dispensing funds and/or products. The validation process can be performed after dispensing funds and/or products. Further, the insurance company can use the data to determine the effects of the device, particular cleansing solutions, and/or other substances dispensed by the device (e.g., tablets, medications, etc.) and/or to track trends of a user and/or a statically significant number of subjects.

Housing 105 can include one or more valve 111, which releases cleansing solution from one or more portions of housing 105 into one or more drain line 112. During a cleansing cycle and/or storing mode, the cleansing solution that was used during the cleansing cycle has converted from being fresh, unused cleansing solution to being used cleansing solution. Upon completion of a cleansing cycle and/or storage mode, cleansing device 100 can operate to drain the then used cleansing solution from baskets 107a-107n. One or more drain line 112 can couple to one or more valve 113 that actuates to release used cleansing solution through one or more drain line 112 into a disposal site (e.g., a sink, a plant, and/or the like). Cleansing device 100 can include a used solution storage 114. One or more valve 113 can actuate to release cleansing solution from drain line 112 into a used solution storage 114.

Used solution storage 114 can store any used liquid, solution, particulates, and/or the like. For example, used solution storage 114 can store contact solution after it has been used to cleans contact lenses. Used solution storage 114 can have a cap, lid, door, drawer, drain, and/or the like that a user removes thereby allowing the used cleansing solution therein to empty out of the used solution storage 114. Used solution storage 114 can have a sponge therein, which is discarded by the user upon saturation. Used solution storage 114 can have an output channel that allows used cleansing solution to drain out used solution storage 114 into a disposal site (e.g., into a sink, into a plant, into a trash can, into a biohazard receptacle, onto the ground, and/or the like). In embodiments, used cleansing solution from used solution storage 114 can be collected and used for testing and diagnostic purposes. The testing and diagnostic purposes can test and diagnose one or more users of cleansing device 100 and/or be used in case studies involving a statistically significant number of subjects. Used solution storage 114 can include testing and diagnostic sensors therein, the receive input (data) from the solution in the used solution storage 114. The data can be communicated to control processor 115 and/or stored in memory 118. Control processor 115 can run analytics on the collected data and store the analytics in memory 118. Control processor 115 can display a graphics user interface on output 117, which can be an LED screen and/or touch screen. Control processor 115 can transmit the analytics and/or the raw data from used solution storage 114 to a central computing device (e.g., server, computer, laptop, smart watch, smart phone, tablet, and/or the like) as is described further below regarding FIGS. 3-4.

Figure 2A:
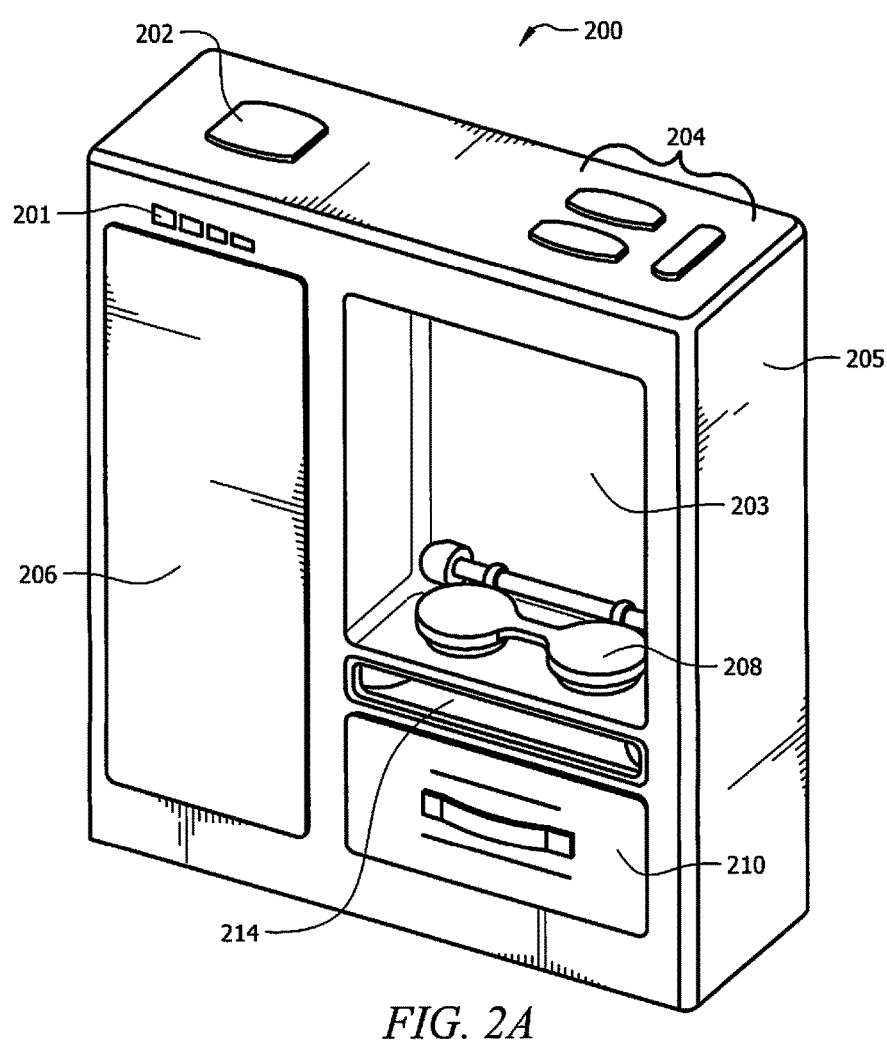
FIG. 2A shows aspects of an exemplary embodiment of a cleansing device as disclosed herein.

FIGS. 2A-2G show exemplary embodiments of contact lens cleansing device 200. FIG. 2A shows an example embodiment contact lens cleansing device 200 as can be seen from a user viewing it on a counter, table, and/or the like. Contact cleansing device 200 can be a handheld cleansing device, made of light weight material, and can easily be placed and/or stored on a bathroom countertop, transported in a suitcase and/or bag, and purchased over the counter and/or shipped in a relatively small and light shipping box.

Cleansing device 200 can include housing 205, within which door 206, drawer 210, and lid 208 connect. Housing 205 can include user output 201, which can be one or more LED lights of any and/or changing colors. User inputs 202 and 204 (e.g., buttons, switches, plungers, etc.) can receive input from a user. Housing 205 can include cavity 203. Cavity 203 can provide access to lid 208. In embodiments, an LED screen, touchscreen, and/or other type of display screen (e.g., a flexible screen, a MEMS screen Micro-Electro-Mechanical-System, and/or the like) can be located within cavity 203. Housing 205 can house cleansing reservoir 214, within which contacts can be cleansed.

Figure 2B:
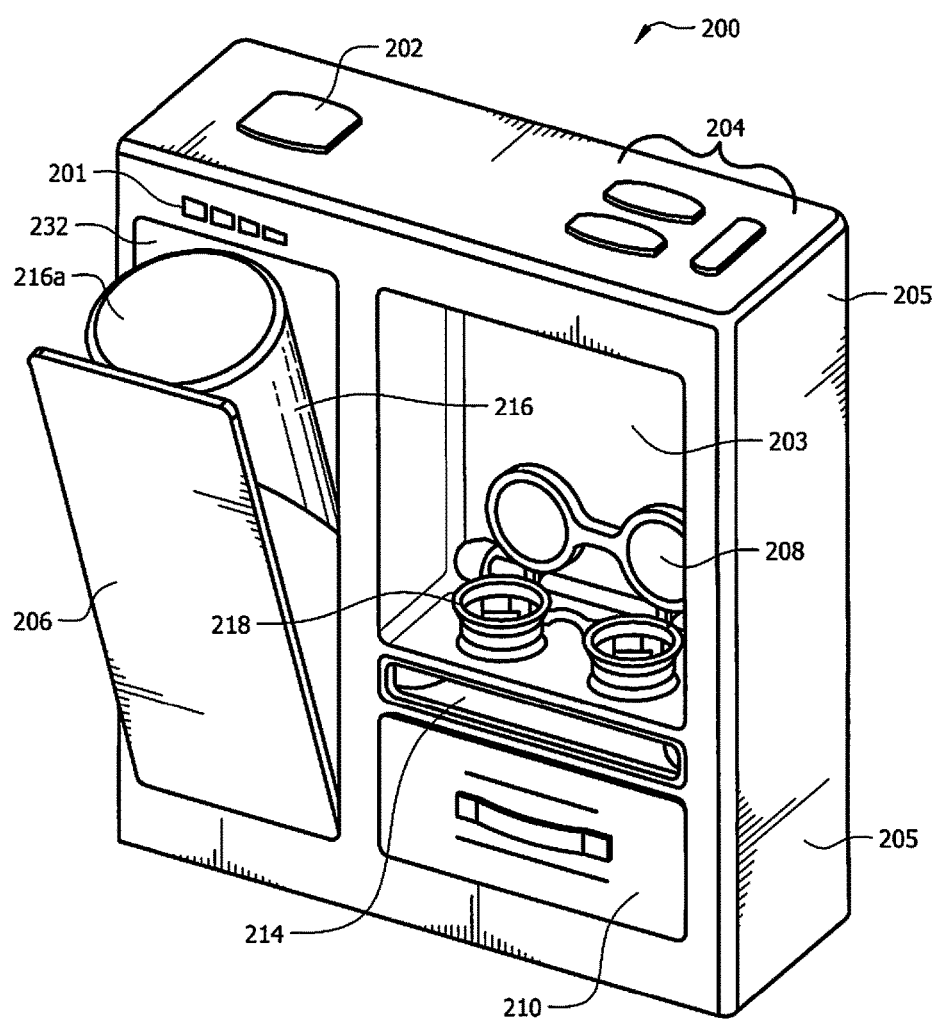
FIG. 2B shows other aspects of an exemplary embodiment of a cleansing device as disclosed herein.

FIG. 2B shows an example of cleansing device 200, wherein some of the internal components are in view. Door 206 is shown in an open (e.g., partial open) position. Behind door 206 is cavity 232, within which is stored cartridge 216. Cartridge 216 is a vessel that stores unused, fresh contact solution. Cartridge 216 can be made of light weight plastic and/or any waterproof disposable material. In some embodiments, cartridge 216 can include a depressible portion 216a, which can be depressed as a plunger in order to controllably force contents stored therein to exit an opposing portion of cartridge 216. Cartridge 216 seats into cavity 232 and is supported, at least partially, by pivoting door 206.

Lid 208 is shown in an example open position. Baskets 218 are shown raised out of cleansing reservoir 214. Contacts (and/or any item desiring of cleansing) can be placed within baskets 218, for example, one contact per basket. Lid 208 can be closed over baskets 218, securing the contacts therein. Baskets 218, can lower into cleansing reservoir 214. Cleansing reservoir 214 can have transparent, translucent, and/or opaque portions thereof. For example, cleansing reservoir 214 can have a transparent front window allowing a user to see contents therein and a cleansing cycle in process. Further, one or more light can be viewed through a front window if desired (e.g., ambient light, communication light, light show, night light, etc.). Further, one or more of the lights can be part of the cleansing cycle and assist in the cleansing process as is described above.

Figure 2C:
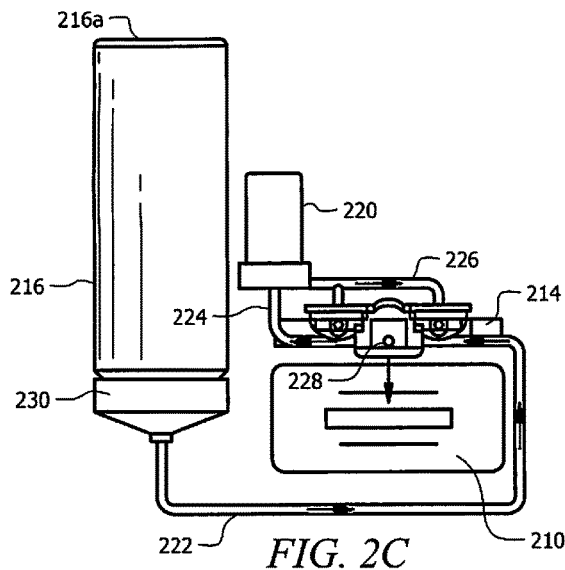
FIG. 2C shows other aspects of an exemplary embodiment of a cleansing device as disclosed herein.
Figure 2D:
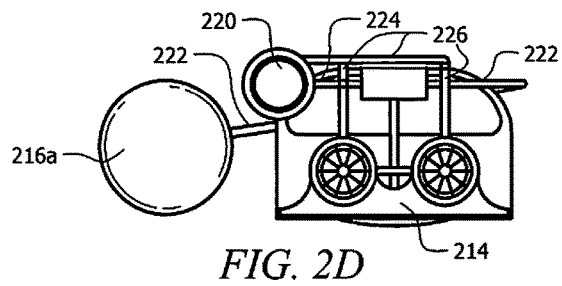
FIG. 2D shows other aspects of an exemplary embodiment of a cleansing device as disclosed herein.
Figure 2E:
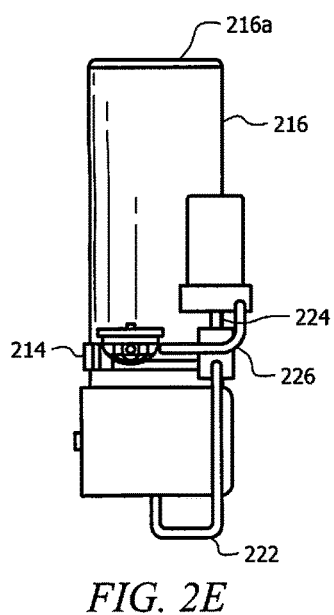
FIG. 2E shows other aspects of an exemplary embodiment of a cleansing device as disclosed herein.
Figure 2F:
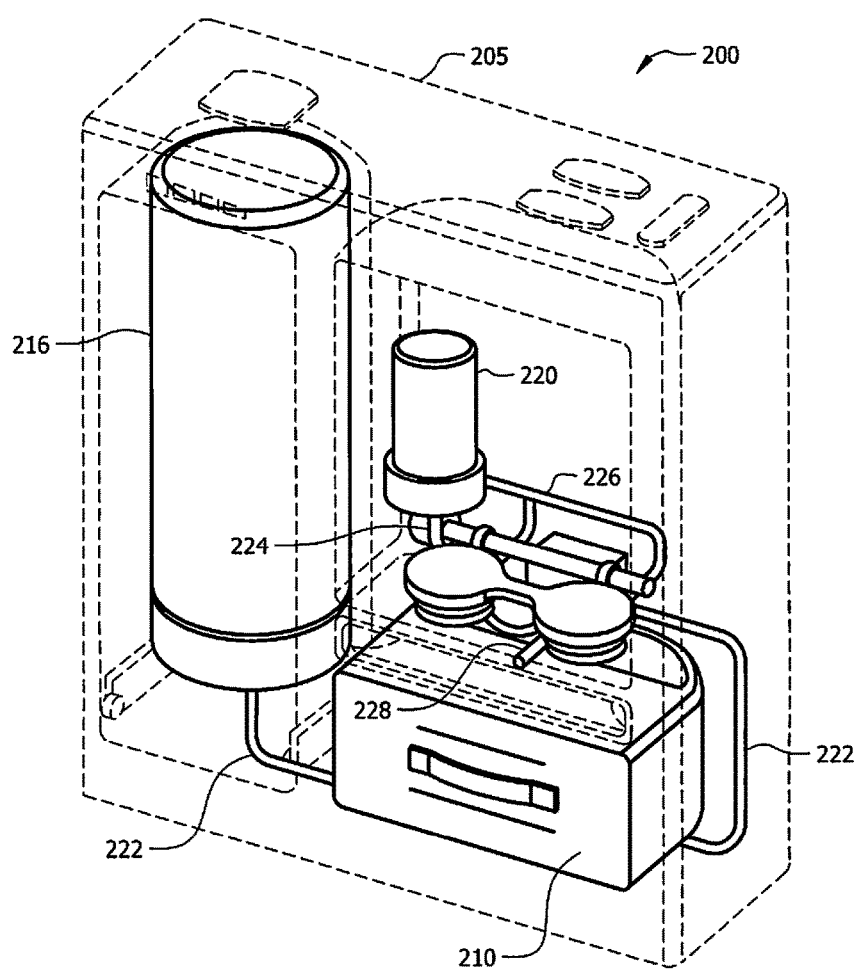
FIG. 2F shows other aspects of an exemplary embodiment of a cleansing device as disclosed herein.

FIGS. 2C-2F shows example components that can be located within housing 205 of cleansing device 200. In FIGS. 2C-2E, housing 205 is not shown. FIG. 2C shows an example front view; FIG. 2D shows an example top-down view; and FIG. 2E shows an example side view. FIG. 2F shows an example angled view, wherein a silhouette of housing 205 is shown.

Referring to FIGS. 2C-2F jointly, cartridge 216 seats within mounting mechanism 230 (e.g., saddle, cradle, coupler, repository, and/or the like). In embodiments, cartridge 216 can have a male configuration and mounting mechanism can have a female configuration, such that, cartridge 216 mounts into mounting mechanism 230. In embodiments, the coupling configuration can have threads such that cartridge 216 screws into mounting mechanism 230; the couple configuration can have tabs, flanges (and/or the like), such that cartridge 216 snaps into mounting mechanism 230; the coupling configuration can utilize gravity such that cartridge 216 simply rests in mounting mechanism 230; and/or the like. Mounting mechanism 230 can include a piercing member (not shown), such that as cartridge 216 is mounted into mounting mechanism 230, piercing member pierces a sealed cover of cartridge 216 wherein allowing the contents of cartridge 216 to exit therefrom in a controlled manner. Prior to the piercing of the sealed cover, the sealed cover can prevent the contents of cartridge 216 from becoming contaminated and provide a visual indicator to a user regarding whether the cartridge has been tampered with and/or previously used.

Coupled to mounting mechanism is line 222 (e.g., hose, pipe, duct, channel, and/or the like), which can be flexible, rigid, and/or anywhere in between. Line 222 allows solution to travel from cartridge 216 to cleansing reservoir 214. Solution can enter line 222 in a controlled manner via one or more cartridge exiting mechanisms. In embodiments, depressible portion 216a can be depressed and plunge downward forcing solution to exit cartridge 216 into line 222. The exiting solution's timing, speed, and amount, can be controlled by the force with which depressible portion 216a is depressed. In embodiments, mounting mechanism 230 can include a value 102a, which controls the timing, speed, and amount of solution exiting cartridge 216. In embodiments, housing 205 can include a pump, which controls the timing, speed, and amount of solution exiting cartridge 216. Embodiments can include one, some, or all of the above cartridge exiting mechanisms, and embodiments can include additional cartridge exiting mechanisms. The cartridge exiting mechanisms can be controlled manually and/or by one or more control processor (e.g., control processor 115). In embodiments, a user can depress a button (e.g., button 202), which presses against depressible portion 216a, controlling and/or partially controlling the timing, speed, and amount of solution exiting cartridge 216. In other embodiments, a user can provide input to cleansing device 200 (e.g., button 202, 204, a touch screen button on a touch screen in cavity 203, providing input via a cell phone, and/or the like), and control processor 115 can control some or all cartridge exiting mechanisms in order to control the timing, speed, and amount of solution exiting cartridge 216.

Solution enters line 222 and travels toward cleansing reservoir 214. For example, circulator pump 220 can draw solution from cartridge 216 inputting the solution into the cleansing reservoir 214. In embodiments, value 104a can be positioned at the junction of line 222 and cleansing reservoir 214. Value 104a can control the timing, speed, and amount of solution that enters cleansing reservoir 214. Embodiments can omit a value at the junction of line 222 and cleansing reservoir 214 and allow solution to freely flow from line 222 into cleansing reservoir 214. Solution can fill cleansing reservoir 214 fully, partially, and/or to a predetermined level. Cleansing reservoir 214 is coupled to one or more circulation lines 224 and 226 that are also coupled to circulator 220. In embodiments, circulator 220 uses circulation lines 224 and 226, and/or additional lines, to circulate solution through cleansing reservoir 214. FIG. 2C shows an example of circulator line 226, wherein circulator line 226 has a split that forces solution into a first basket and forces solution into a second basket.

Control processor 115 can control circulator 200 to control the timing, speed, and amount of solution forced through one or more of circulation lines 224 and 226. The timing, speed, and amount of solution forced through one circulation line can be the same and/or different from another of the circulation line. Circulator 200 can operate to change the timing, speed, and amount of solution forced through one or more of circulation lines 224 and 226 according to one or more cleansing cycles. In embodiments, a cleansing cycle can circulate solution at a constant rate for a threshold amount of circulation time, upon which the process is complete. In embodiments, a cleansing series and/or cleansing cycle can be preprogramed (and/or received programming for example via transceiver 119), stored in memory 118, and executed by control processor 115. In embodiments, a cleansing cycle can vary the timing, speed, and amount of solution forced through one or more of circulation lines 224 and 226 based on parameters. Cleansing cycles can include a plurality of sequential steps performed according to a cycle that is stored in memory 118. Various steps can include solution circulation, air circulation, soaking, heating, lighting, vibrating, and/or the like. The steps can be performed in any order, for any length of time, at any intensity, and in combination with each other, as is designated by a cycle program stored in memory 118. Further control processor 115 can alter a stored cycle program based on parameters, as are described below, such that one or more step is performed a different number of times, in a different order, for a different length of time, at a different intensity, and/or according to a different combination as compared to the cycle program stored in memory 118.

Various parameters can include a user selection, a measured level of contamination, litmus tests conducted during the cleansing cycle, a determined level of dirtiness, a determined level of proteins and/or pollutants, a determined amount of time since the last cleansing of the item (e.g. contacts), a determined time, day, and/or week. In embodiments, a cleansing series can involve multiple cleansing cycles that are prescribed to be carried out over a period of time. For example, a cleansing series can be thirty days long, wherein over a thirty day period thirty cleansing cycles are intended to be performed. A multiple cleansing cycle cleansing series can vary the cleansing cycles as time progresses and/or as the number of cleansing cycles progress. For example, the timing, speed, and amount of solution forced through one or more of circulation lines 226 can be different in the first cleansing cycle of the cleansing series as compared to the second cleansing cycle of the cleansing series as compared to the nth cleansing cycle of the cleansing series. In embodiments, with each cleansing of a contact lens, the cleansing cycles can become longer and/or more aggressive than before; with each cleansing of a contract lens, the cleansing cycles can become longer and/or less aggressive than before; and/or any combination thereof. In embodiments, a cleansing series can utilize a different solution every nth cleansing cycle (e.g., every 5th cleansing cycle) to provide a deeper cleansing according to a preset schedule. In embodiments, a cleansing series can utilize a different solution when a certain bacteria detected, when a threshold level of contamination is detected, and/or when a certain litmus test result occurs. In embodiments, one or more sensors 131, 132, and the like can assist in determining various parameters.

Cleansing cycles and/or cleansing series can be monitored and data and/or results thereof recorded in memory 118. Data and/or results can be viewed by a user and/or transmitted to a central facility such that a centralized administrator can monitor the results. In light of information received via transceiver 118, an administrator (e.g., doctor) can send new cleansing cycles and/or cleansing series to cleansing device 200 and/or otherwise change a cleansing cycle and/or cleansing series via programming loaded into device 200.

In an example cleansing cycle, device 200 locks locking mechanism 121 and draws cleansing solution from cartridge 216 into cleansing reservoir 214 until a threshold amount of cleansing solution has been drawn. Next, circulator 220 circulates the cleansing solution for a threshold amount of circulating time. Then, circulator 220 ceases circulation and the contacts soak in the cleansing solution for a threshold amount of soaking time. In embodiments, additional steps can be included and/or some steps can be omitted. At the conclusion of this example cleansing cycle, device 200 unlocks locking mechanism 121. Upon completion of a cleansing cycle, an indicator can provide an indication to the user that the cleansing cycle is complete. In embodiments, an LED can turn on, change color, and/or otherwise provide an indication. Additionally and/or alternatively, a sound can provide an indication. In embodiments, the cessation of one or more circulators can cause the absence of sound or vibrations that can provide an indication. Further, a locking mechanism unlocking can be an indication. Further, a message can be sent to a user's communications device (e.g., smart phone) thereby providing an indication. One or more indication can be provided as is desired. A user can input a selection indicating which indication they prefer.

Upon completion of a cleansing cycle, cleansing reservoir 214 can enter a storing mode. In storing mode, cleansing reservoir 214 stores the items therein. During storing mode, some, none, or a portion of solution can exit cleansing reservoir 214 via line 228. In embodiments, a predetermined amount of solution remains within cleansing reservoir 214 to maintain a desired moisture level of the item being stored therein. For example, if cleansing device 200 completed a contact cleansing cycle, during storing mode, a threshold level of solution remains in cleansing reservoir 214 to maintain the contact's moisture. When a user is ready to retrieve the item from baskets 218, if any solution is remaining in cleansing reservoir 214, the solution can drain via drain line 228 at that time. In another example, if cleansing device 200 completed a self-cleansing cycle, then in storing mode, cleansing reservoir 214 can drain all the solution via drain line 228, and actively or passively allow device 200 to dry (e.g., via circulating air, using light, using heat, and/or using vibrations).

Figure 2G:
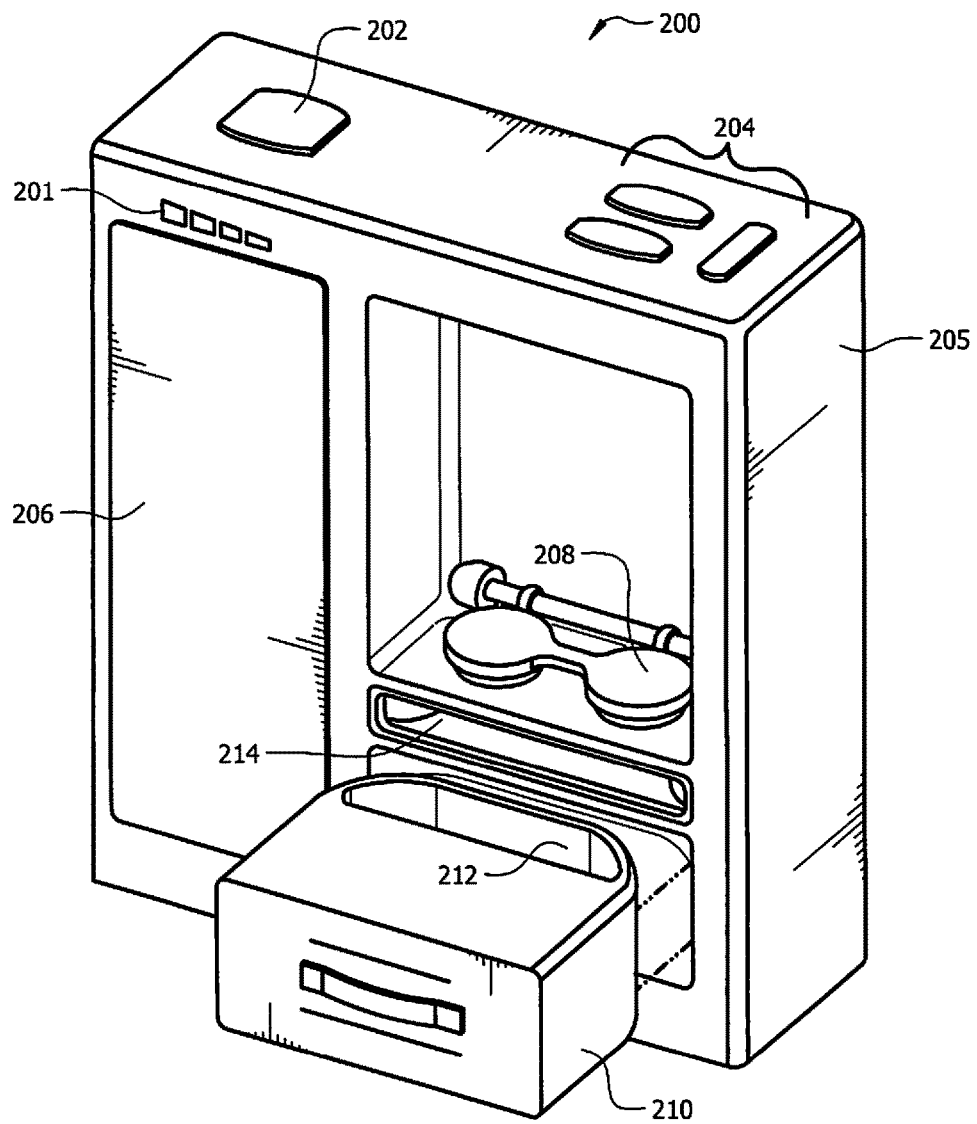
FIG. 2G shows other aspects of an exemplary embodiment of a cleansing device as disclosed herein.

FIG. 2G illustrates an example of cleansing device 200 that shows additional internal components. Drawer 210 is illustrated in an open position showing used solution storage 212 therein. Drain line 228 outputs solution into used solution storage 212. In embodiments, used solution storage 212 is a cavity of drawer 210, and a user can remove drawer 210 and pour out the used solution, for example, by pouring the used solution down a sink. In embodiment, a user can pour the used solution into a container and deliver the used solution to a facility (e.g., medical office) for testing.

Figure 3:
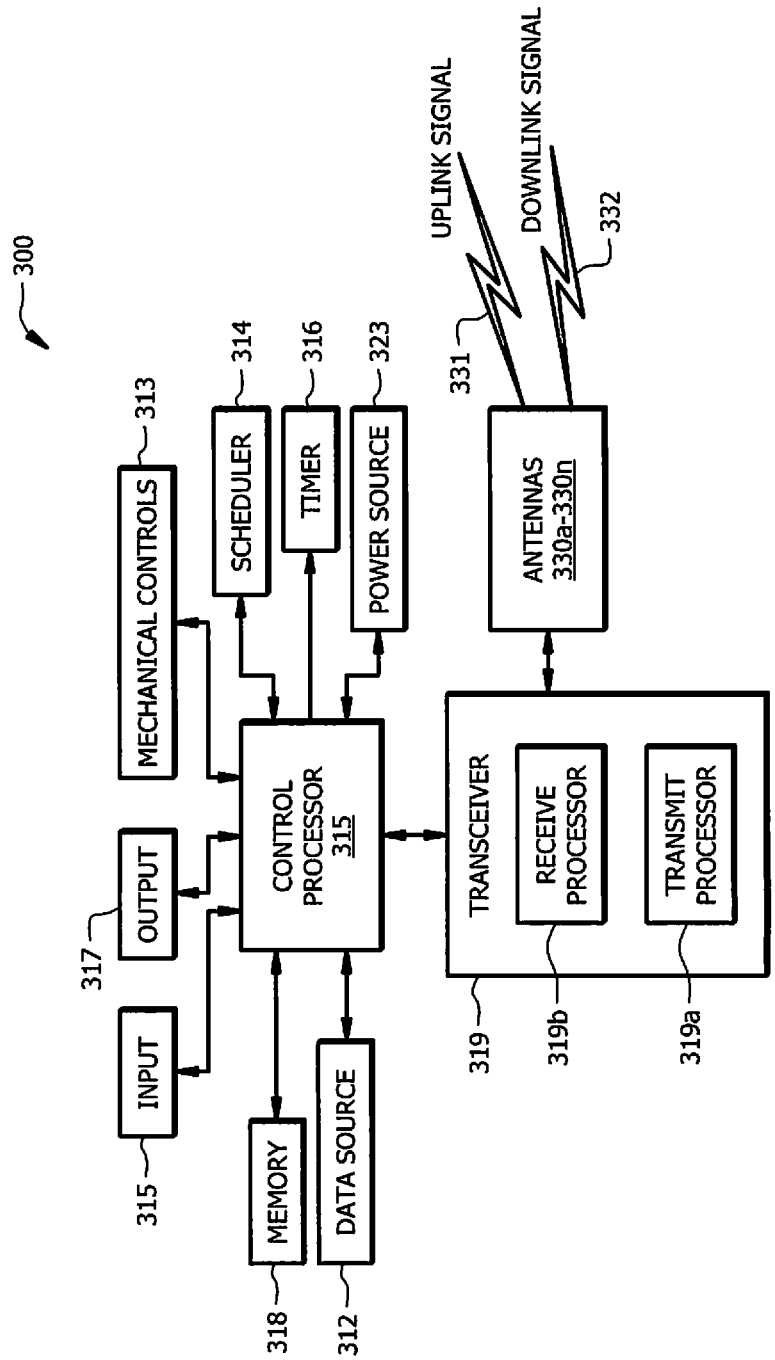
FIG. 3 illustrates a block diagram of an exemplary embodiment of a circuitry system, which can be included within embodiments of cleansing devices as disclosed herein.

FIG. 3 shows a block diagram of an example circuitry system of cleansing device 300. Control processor 315 and/or other processors and modules can perform or direct the execution of various processes and techniques described herein. One or more memory 318 can be a non-transitory storage of data and program code for cleansing device 300, which can be executed to perform techniques described herein. Scheduler 314 can schedule and track herein described processes, cleansing cycles, maintenance, communications, and/or the like. Timer 316 can function in conjunction with scheduler 314 to perform herein described processes, cleansing cycles, maintenance, communications, and/or the like.

Control processor 315 can perform processes using one or more electrical, mechanical, magnetic, etc. controls 313 (e.g., locks, drawers, doors, valves, etc.) in response to instructions provided by scheduler 314, timer 316, and/or memory 318. Control processor 315 can receive user input from input 316, which can be a switch, button, toggle, and/or the like. Further, input 316 can be a local and/or remote touch screen (e.g., a smart phone). Control processor 315 can output user information/data to output 317, which can be one or more of a microphone, light, switch, aroma generator, vibrator, flavor provider, and/or the like. Further, output 137 can be a screen (e.g., LED screen) that conveys information and can combine with input 136 (e.g., depressible light/button, tactile switch, remote and/or local touch screen, etc.). Further, cleansing device 300 includes one or more power source 323. Power source 323 can be one or more AC, DC, USB cable, and/or the like that connects to a power socket. Power source 323 can be one or more batteries (e.g., rechargeable battery, lithium battery, and/or the like). Further, power source 323 can include solar power and/or charge wirelessly (e.g., via capacitor technology).

Cleansing device 300 can include transceiver 319 comprising one or more transmit processor 319a that can receive data from data source 312 and control information from control processor 315. Transmit processor 319a can transmit via multiple-input multiple-output (MIMO), multiple-input single-output (MISO), single-input single-output (SISO), single-input multiple-output (SIMO), and/or the like using one or more antennas 330a-330n. Transmit processor 319a can perform processing (e.g., convert to analog, amplify, filter, and upconvert) on a signal prior to transmission. Uplink signals 331 can be uplink transmitted via antennas 330a-330n.

Antennas 330a-330n can receive the downlink signals 332 from a wireless communication system (e.g., base station, femto cell, relay, peer to peer, smart phone, etc.). Receive processor 319b can condition (e.g., filter, amplify, downconvert, and digitize) a respective received signal to obtain data, software updates, and/or other information. Receiver processor 319b can receive via multiple-input multiple-output (MIMO), multiple-input single-output (MISO), single-input single-output (SISO), single-input multiple-output (SIMO), and/or the like. Receive processor 319b can process (e.g., demodulate, deinterleave, and decode) the detected a signal and provide decoded data for cleansing device 300 to memory 318 and/or provide decoded control information to controller/processor 315.

Figure 4:
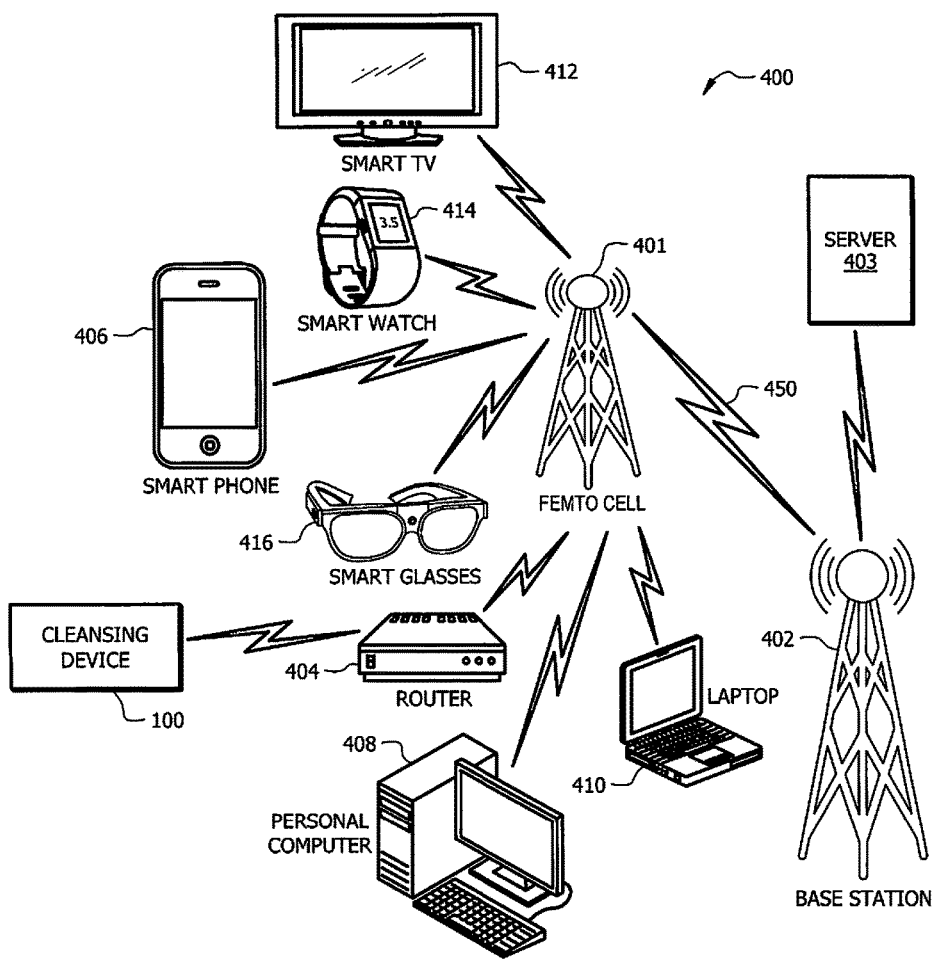
FIG. 4 is block diagram of an exemplary embodiment of a network within which a cleansing device as disclosed herein can communicate.

FIG. 4 shows wireless network 400 for communication according to some embodiments. While discussion of the technology of this disclosure is provided relative to wireless communications, wired communications can supplement and/or replace the wireless communications. Wireless communications can include the Internet of Things (IoT), long term evolution (LTE), LTE-A, third generation (3G), fourth generation (4G), fifth generation (5G), and/or other network deployments. Components of FIG. 4 can include cellular-style network arrangements and non-cellular-style-network arrangements (e.g., device-to-device, peer-to-peer, or ad hoc network arrangements, etc.).

Wireless network 400 includes a number of base stations 402, such as can comprise evolved node Bs (eNBs) or G node Bs (gNBs). A base station 402 can provide communication coverage for a macro cell or a small cell, such as a pico cell or a femto cell 401, and/or other types of cell. A macro cell generally covers a relatively large geographic area (e.g., several kilometers in radius) and can allow unrestricted access by wireless devices with service subscriptions with the network provider (e.g. smart phone 406). A small cell, such as a femto cell 401, would generally cover a relatively small geographic area (e.g., a home) and, in addition to unrestricted access, can also provide restricted access by wireless devices (e.g., smart TV 412, laptop 410, personal computer 408, and the like) having an association with the femto cell 401 (e.g., wireless devices in a closed subscriber group (CSG), devices for users in the home, and the like).

Wireless devices are dispersed throughout wireless network 400, and each wireless device can be stationary or mobile. Some non-limiting examples of wireless devices include a router 404, a cellular (cell) phone, a smart phone 406, a session initiation protocol (SIP) phone, a laptop 410, a personal computer (PC) 408, a notebook, a netbook, a smart book, a tablet, and a personal digital assistant (PDA), a smart watch 414, smart glasses 416 and/or the like. A mobile apparatus can additionally be an IoT device such as intelligent lighting, a home security system, a smart meter, a smart TV 412, a smart appliance, a smart cleansing device 100, etc. A wireless device, such as cleansing device 100, can be able to communicate with macro base stations, pico base stations, femto cells, routers, relays, and the like. In FIG. 4, a lightning bolt (e.g., communications link 450) indicates wireless transmissions between systems on the downlink and/or uplink. Networks include one or more backhaul servers, which communicate with base stations and provide network side services.

Cleansing device 100 can communicate in a wireless network, for example network 400 to send and receive data from a centralized location (e.g., server 403). As described above, cleansing device 100 can collect raw data and/or analytics and send the raw data and/or analytics to another device including but not limited to smart phone 406, smart TV 412, smart watch 414, smart glasses 416, personal computer 408, laptop 410, and or the like. Further, cleansing device 100 can collect raw data and/or analytics and send the raw data and/or analytics to a centralized server that collects data from multiple cleansing devices 400 across a distributed network. Various data and/or analytics can be used to study users of one or more users of a particular cleansing device 100. Additionally and/or alternatively, various data and/or analytics can be used to study users of a plurality of cleansing devices 400 for the purposes of research, which can include statistically significant subject samples. Studies can be used to alter particular cleansing cycles and/or cleansing series for a user of a cleansing device. Studies can be used for diagnosis of machinery defects and/or one or more patient's health. Data can be used for marketing, advertising, to sell replacements parts, additional cartridges, implement recalls, and/or the like.

Figure 5:
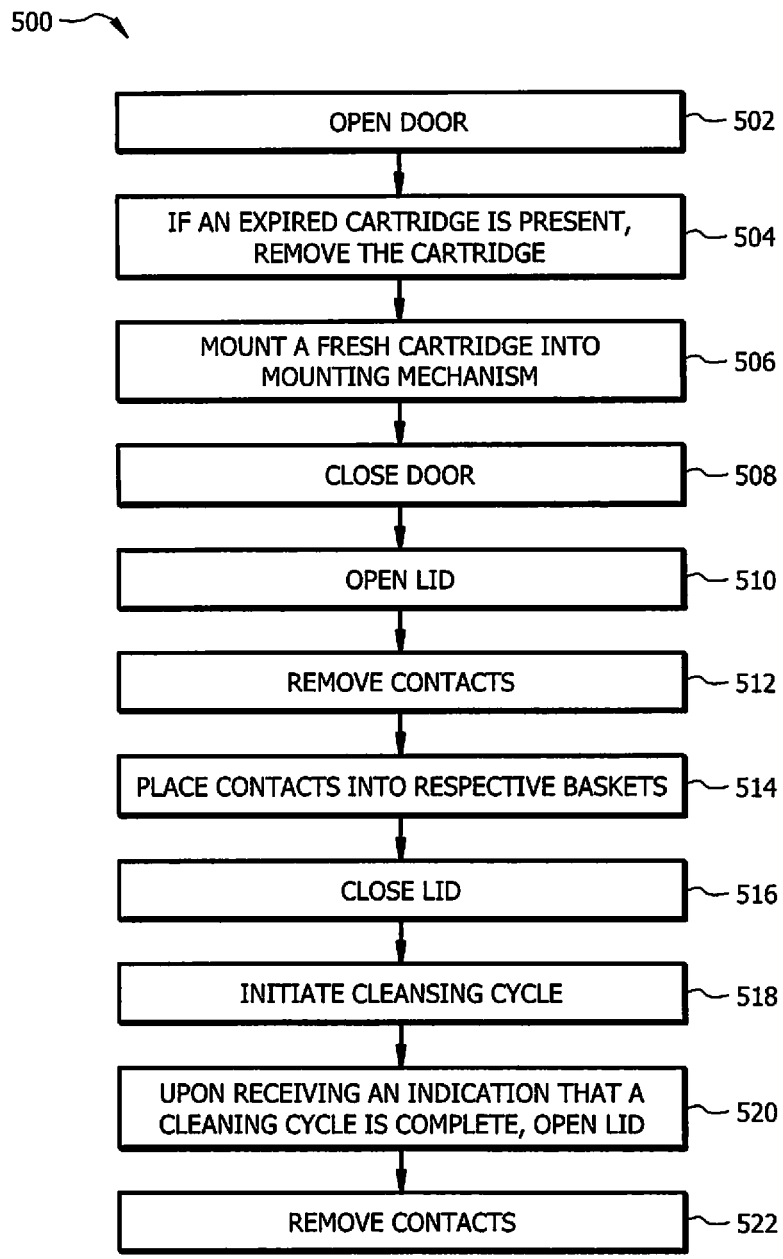
FIG. 5 shows aspects of an exemplary method involving systems and devices disclosed herein.

FIG. 5 illustrates an example method 500 of using the devices disclosed herein. Please note that some of the steps can be omitted from time to time and can be done in a different order from time to time. At step 502, a user opens the door. In step 504, if an expired cartridge is present, a user removes the expired cartridge, and at step 506, the user mounts a fresh cartridge into the mounting mechanism. At step 508, the user closes door. At step 510, a user can open the lid. At step 512, a user can remove contacts (or other item being cleansed). At step 514, a user can place the contacts (or other item) into respective baskets. At step 516, a user can close the lid. At step 518, a user can initiate a cleansing cycle (e.g., press a start button). Upon receiving an indication that a cleansing cycle is complete, at step 520, a user can open the lid. At step 522, a user can remove the contacts (or other item) from the baskets. After example method 500 is complete, the cleansing device 100 can initiate a self-cleansing cycle.

Figure 6:
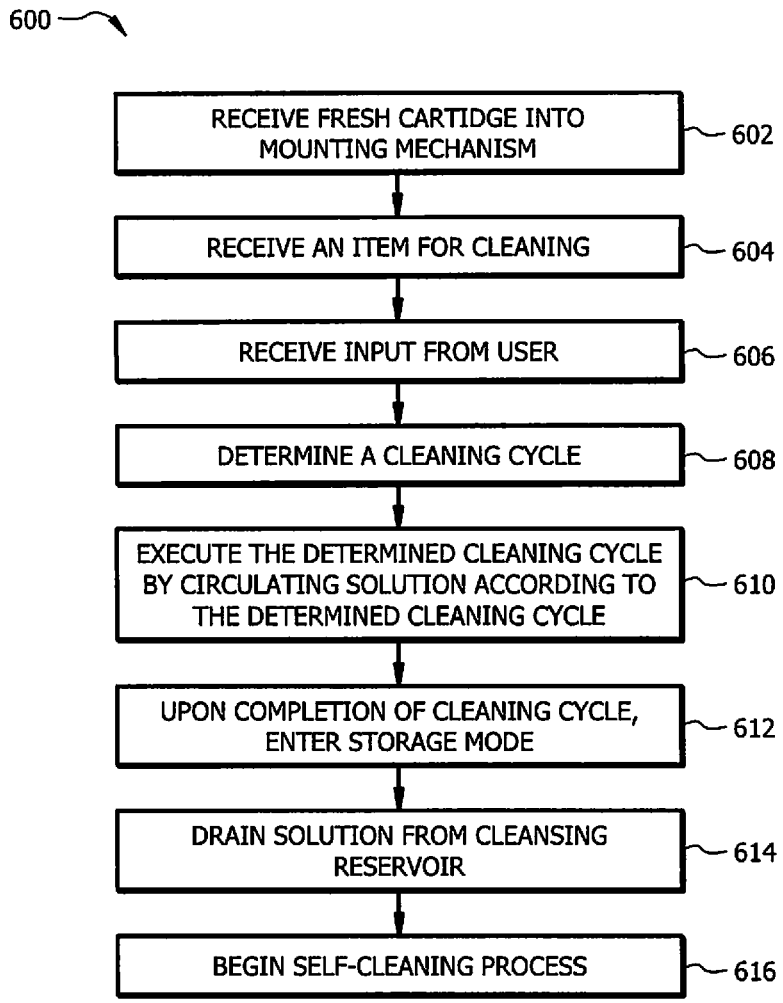
FIG. 6 shows aspects of another exemplary method involving systems and devices disclosed herein.

FIG. 6 illustrates an example method 600 that a cleansing device, as described herein, can execute. Please note that some of the steps can be omitted from time to time and can be done in a different order from time to time. At step 602, a cleansing device receives a fresh cartridge into mounting mechanism. At step 604, the cleansing device receives an item for cleansing. At step 606, the cleansing device receives input from a user indicating that a cleansing cycle is desired. At step 608, the cleansing device determines which cleansing cycle to perform. At step 610, the cleansing device executes the determined cleansing cycle by circulating solution according to the determined cleansing cycle's schedule. In embodiments, a cleansing cycle can include any combination of period of circulation, soaking, lighting, heating, vibrating, and/or the like. Upon completion of the cleansing cycle, at step 612, the cleansing device enters storage mode. At step 614, the cleansing device drains solution from cleansing reservoir. After example method 600 is complete, the cleansing device can initiate self-cleansing cycle.

A self-cleansing cycle is a cycle wherein the cleansing device cleanses itself. Similar to that of a cleansing cycle and/or cleansing series, one or more self-cleansing cycles can be stored in memory 118 and can be performed based on parameters. Any of the parameters described above can be used when control processor 115 determines which self-cleansing cycle to perform. Solution from cartridge 216, other solutions, heat, light, vibrations, circulation of air, and any other cleansing means described herein can be utilized as part of a self-cleansing cycle.

Although the present example inventions and its advantages have been described in detail, it should be understood that various changes, substitutions and alterations can be made herein without departing from the spirit and scope of the example inventions as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present example inventions, processes, machines, manufacture, compositions of matter, means, methods, or steps, presently existing or later to be developed that perform substantially the same function or achieve substantially the same result as the corresponding embodiments described herein can be utilized according to the present example inventions. Accordingly, the appended claims are intended to include within their scope such processes, machines, manufacture, compositions of matter, means, methods, or steps.

The invention claimed is:

1. An automated contact lens cleansing device for performing a plurality of cleansing cycles, each of the plurality of cleansing cycles having different characteristics, the device comprising:
   a solution storage unit configured to reversibly mate with at least one of a plurality of disposable receptacles containing sterile cleansing solution and secure the at least one of the plurality of disposable receptacles, where the at least one of the plurality of disposable receptacles becomes unsealed when mated with the solution storage unit and is replaceable after consumption of the sterile cleansing solution;
   a first solution transfer line that draws the sterile cleansing solution from the at least one of the plurality of disposable receptacles;
   a cleansing reservoir that receives the sterile cleansing solution drawn by the first solution transfer line;
   at least one circulator that circulates the sterile cleansing solution through the cleansing reservoir for a determined circulating time, where the sterile cleansing solution is determined to be used solution upon circulating through the cleansing reservoir for the determined circulating time;
   a second solution transfer line that draws the used solution from the cleansing reservoir to a drain;
   a memory that stores instructions to perform at least one of the plurality of cleansing cycles; and
   a control processor that, when executing the stored instructions, controls the first solution transfer line, the second solution transfer line, and the circulator, wherein controlling the at least one circulator comprises circulating the sterile cleansing solution through the cleansing reservoir for the determined circulating time.

2. The automated contact lens cleansing device of claim 1 wherein at least one of the plurality of cleansing cycles is a device self-cleansing cycle.

3. The automated contact lens cleansing device of claim 1 wherein at least one of the plurality of cleansing cycles is a contact lens cleansing cycle.

4. The automated contact lens cleansing device of claim 1 wherein the instructions to perform at least one of the plurality of cleansing cycles provides a first cleansing cycle having at least one different characteristic than a second cleansing cycle, wherein the at least one different characteristic is at least one of:
   a circulation rate;
   a type of sterile cleansing solution; and
   a cleansing procedure in addition to the circulating the sterile cleansing solution through the cleansing reservoir for the determined circulating time.

5. The automated contact lens cleansing device of claim 1, further comprising:
   one or more sensors that collects data at least related to a condition of one or more components of the automated contact lens cleansing device; and
   a transceiver that sends a transmission reporting at least one of:
      the condition of the one or more components of the automated contact lens cleansing device, and
      diagnostic information about the automated contact lens cleansing device.

6. The automated contact lens cleansing device of claim 5 wherein in response to the transmission, the transceiver receives a data structure comprising instructions that, when executed by the control processor, perform maintenance of the automated contact lens cleansing device.

7. The automated contact lens cleansing device of claim 5, further comprising:
   a digital user interface that displays information to a user and receives input from the user,
   wherein in response to the transmission, the transceiver receives a data structure that when executed by the control processor displays on the digital user interface a choice of replacement component options, the replacement component options are based on information from the transmission, and
   wherein the digital user interface receives input from the user selecting at least one of the replacement component options.

8. The automated contact lens cleansing device of claim 1, further comprising:
   one or more sensors that collects data at least related to a condition of one or more contact lenses; and
   a transceiver that sends a transmission reporting at least one of:
      the condition of the one or more contact lenses, and
      diagnostic information about a user.

9. The automated contact lens cleansing device of claim 8 wherein in response to the transmission, the transceiver receives a data structure causing the control processor to select, based at least on information from the transmission, a cleansing cycle of the plurality of cleansing cycles.

10. The automated contact lens cleansing device of claim 8, further comprising:
a digital user interface that displays information to the user and receives input from the user, wherein the digital user interface displays at least one of:
the condition of the one or more contact lenses, and
diagnostic information about the user.

11. The automated contact lens cleansing device of claim 1, further comprising:
a digital user interface that displays information to a user and receives input from the user, wherein the input from the user influences a selection of a cleansing cycle from the plurality of cleansing cycles stored in the memory.

12. A method of cleaning a contact lens using an automated contact lens cleansing device that performs a plurality of cleansing cycles, each of the plurality of cleansing cycles having different characteristics, the method comprising:
securing, by a solution storage unit, at least one of a plurality of disposable receptacles containing sterile cleansing solution, wherein the at least one of the plurality of disposable receptacles becomes unsealed when mated with the solution storage unit and is replaceable after consumption of the sterile cleansing solution;
storing, in a memory of the automated contact cleansing device, instructions to perform at least one of the plurality of cleansing cycles; and
executing, by a control processor according to the instructions, at least one of the plurality of cleansing cycles at least by:
drawing, by a first solution transfer line under control of the control processor, the sterile cleansing solution from the at least one of the plurality of disposable receptacles into a cleaning reservoir,
circulating, by at least one circulator under control of the control processor, the sterile cleansing solution through the cleansing reservoir for a determined circulating time, wherein the sterile cleansing solution is determined to be used solution upon circulating through the cleansing reservoir for the determined circulating time, and
draining, by a second solution transfer line under control of the control processor, the used solution from the cleansing reservoir.

13. The method of claim 12 wherein at least one of the plurality of cleansing cycles is a device self-cleansing cycle.

14. The method of claim 12 wherein at least one of the plurality of cleansing cycles is a contact lens cleansing cycle.

15. The method of claim 12 wherein the instructions to perform at least one of the plurality of cleansing cycles provides a first cleansing cycle having at least one different characteristic than a second cleansing cycle, wherein the at least one different characteristic is at least one of:
a circulation rate;
a type of sterile cleansing solution; and
a cleansing procedure in addition to the circulating the sterile cleansing solution through the cleansing reservoir for the determined circulating time.

16. The method of claim 12, further comprising:
collecting data, by one or more sensors under control of the control processor, wherein the data relates to a condition of one or more components of the automated contact lens cleansing device; and
sending, by a transceiver under control of the control processor, a transmission reporting at least one of:
the condition of the one or more components of the automated contact lens cleansing device, and
diagnostic information about the automated contact lens cleansing device.

17. The method of claim 16 wherein in response to the transmission, the method further comprises:
receiving a data structure comprising instructions that, when executed by the control processor, perform maintenance of the automated contact lens cleansing device.

18. The method of claim 16 wherein in response to the transmission, the method further comprises:
receiving a data structure that when executed by the control processor displays a digital user interface having a choice of replacement component options, wherein the replacement component options are based on information from the transmission, and
receiving input, by the digital user interface from a user, selecting at least one of the replacement component options.

19. The method of claim 12, further comprising:
collecting data, by one or more sensors under control of the control processor, wherein the data relates to a condition of one or more components of the automated contact lens cleansing device; and
displaying information to a user on a digital user interface that receives input from the user, wherein the information is related to at least one of:
the condition of one or more contact lenses, and
diagnostic information about the user.

20. The method of claim 12, further comprising:
collecting data, by one or more sensors under control of the control processor, wherein the data relates to a condition of one or more components of the automated contact lens cleansing device;
sending, by a transceiver under control of the control processor, a transmission reporting at least one of:
the condition of one or more contact lenses, and
diagnostic information about a user; and
in response to the transmission, receiving a data structure causing the control processor to select, based at least on information from the transmission, a cleansing cycle of the plurality of cleansing cycles.

* * * * *

UNITED STATES PATENT AND TRADEMARK OFFICE
CERTIFICATE OF CORRECTION

PATENT NO. : 10,101,599 B1
APPLICATION NO. : 15/857450
DATED : October 16, 2018
INVENTOR(S) : Austin Greeson Page 1 of 1

It is certified that error appears in the above-identified patent and that said Letters Patent is hereby corrected as shown below:

In the Claims

At Column 20, Claim number 7, starting at Line number 50, delete "that when executed by the control processor displays" and replace with --that, when executed by the control processor, displays--.

At Column 20, Claim number 7, Line number 52, delete "options, the replacement component options are based" and replace with --options, wherein the replacement component options are based--.

At Column 22, Claim number 18, starting at Line number 26, delete "that when executed by the control processor displays" and replace with --that, when executed by the control processor, displays--.

Signed and Sealed this
Fourth Day of December, 2018

Andrei Iancu
*Director of the United States Patent and Trademark Office*